United States Patent [19]
Horimoto

[11] 4,256,373
[45] Mar. 17, 1981

[54] FISH EYE LENS SYSTEM

[75] Inventor: Mitsuaki Horimoto, Osaka, Japan

[73] Assignee: Minolta Camera Kabushiki Kaisha, Osaka, Japan

[21] Appl. No.: 932,179

[22] Filed: Aug. 9, 1978

[30] Foreign Application Priority Data

Aug. 17, 1977 [JP] Japan ................................ 52/98894

[51] Int. Cl.³ .............................................. G02B 9/62
[52] U.S. Cl. ............................... 350/463; 350/464; 350/465
[58] Field of Search ............... 350/214, 176, 215, 216

[56] References Cited
U.S. PATENT DOCUMENTS

| | | | |
|---|---|---|---|
| 3,515,462 | 6/1970 | Kazamaki et al. | 350/214 |
| 3,549,241 | 12/1970 | Mori | 350/214 X |
| 3,597,049 | 8/1971 | Ogura | 350/214 X |
| 3,601,473 | 8/1971 | Mandler et al. | 350/215 |
| 3,734,600 | 5/1973 | Shimizu | 350/216 X |
| 3,850,509 | 11/1974 | Nakagawa | 350/214 |
| 3,877,795 | 4/1975 | Yamashita | 350/176 X |
| 3,924,935 | 12/1975 | Takahashi et al. | 350/176 X |

*Primary Examiner*—Paul A. Sacher
*Attorney, Agent, or Firm*—Jackson, Jones & Price

[57] ABSTRACT

An improved high speed fish eye lens system is provided capable of compensating for lateral chromatic aberration, field curvature and astigmatism while providing an aperture ratio of F/2.8. The fish eye lens system includes a first lens group of a negative refractive power having two negative meniscus single lenses convex to the object side. A second lens group of a positive refractive power includes a doublet, while a third lens group of a positive refractive power includes at least a positive meniscus single lens convex to the image side and a doublet.

18 Claims, 16 Drawing Figures

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

FISH EYE LENS SYSTEM

BACKGROUND OF THE INVENTION

1. Field of the Invention

The present invention relates to a photographic fish eye lens system having a field angle of 180° and more particularly to an improved fish eye lens system having an aperture ratio of F/2.8.

2. Description of the Prior Art

In the photography field, the advantages of extremely wide angle lens systems and more particularly, fish eye lens systems are well known. There is a continual desire in the camera industry to provide extremely lightweight and compact lens systems for use with conventional camera bodies such as the single lens reflex camera. Unfortunately, these demands are difficult to accomplish while maintaining 180° field angle. As the fish eye lens system is made more compact, the light rays passing through the system are subjected to extreme bending which creates considerable problems in compensating for lateral chromatic aberration, astigmatism and curvature of the field. Another problem with a 35 mm SLR camera is the positioning of the reflecting mirror, which requires the fish eye lens system to have a relatively long back focal length. A suggested solution to some of these problems can be found in the inventor's earlier work disclosed in U.S. Pat. No. 4,009,943 where an aperture ratio of F/4 was achieved for use with a compact single lens reflex camera.

Generally, the solution of the problems of field curvature, astigmatism and lateral chromatic aberrations require the diameter of the front lens element and the total length of the lens system along the optical axis to be increased. Regretfully, this is directly at odds with a compact format size.

Numerous examples of fish eye lens systems are disclosed in the patent literature.

The Ogura U.S. Pat. No. 3,597,049 provides one example of solving the problems associated with a fish eye lens system by controlling the Abbe values of the lens elements. The Japanese Patent Nos. 47-23576; 47-35019 and 39-18718 are additional examples of fish eye lens systems. Other examples of prior art patents can be found in the Yamashita et al U.S. Pat. No. 3,870,400; Zimmerman et al U.S. Pat. No. 3,132,199; Mukai U.S. Pat. No. 2,969,713; Nakagawa U.S. Pat. No. 3,741,630; Shimizu U.S. Pat. No. 3,734,600 and Kazamaki et al U.S. Pat. No. 3,515,462.

The prior art is still seeking to provide a compact improved fish eye lens system of a relatively high speed that is both photographically acceptable and which can be manufactured relatively inexpensively.

SUMMARY OF THE INVENTION

The present invention is adapted for use with a compact SLR camera body and provides a high speed fish eye lens system having an aperture ratio of about F/2.8, and a back focal length greater than two times the focal length of the system. The invention provides satisfactory compensation for spherical and lateral chromatic aberrations and astigmatism resulting from a field angle of 180°. These objectives are obtained while still providing a relative compact fish eye lens system. The fish eye lens system includes a first lens group of a negative refractive power consisting of two negative meniscus single lenses each convex to the object side. A second lens group of a positive refractive power includes at least a doublet having an intermediate cemented surface. A third lens group of a positive refractive power includes at least a positive meniscus single lens that is convex to the image side, plus a doublet having an intermediate cemented surface.

The design parameters of the improved fish eye lens system include the following conditions;

| | | | | |
|---|---|---|---|---|
| 0.5 | < | $|f_I|/f$ | < | 0.8 |
| 1.5 | < | $f_{II}/f$ | < | 2.8 |
| 8.0 | < | $\overline{v}_N - \overline{v}_P$ | < | 25.0 |
| 0.7 | < | $|r_{II}|/f$ | < | 3.5 |
| 0.18 | < | $\overline{N}_N - \overline{N}_P$ | < | 0.36 |
| 0.6 | < | $|r_{III}|/f$ | < | 1.7 |
| 2.2 | < | $\Sigma d/f$ | < | 3.2 |
| 0.65 | < | $r_2/f$ | < | 0.92 |

Wherein:

f represents the focal length of the whole lens system;

$f_1$ represents the focal length of the first lens group;

$f_{II}$ represents the focal length of the second lens group;

$\overline{v}_P$ represents the average of Abbe number of glass material for positive lens element (s) in the second lens group;

$\overline{v}_N$ represents the average of Abbe number of glass material for negative lens element (s) in the second lens group;

$r_{II}$ represents the radius of curvature of the intermediate cemented surface in the second lens group;

$\overline{N}_P$ represents the average of refractive indices of glass material for the positive lens elements in the third lens group;

$\overline{N}_N$ represents the average of refractive indices of glass material for the negative lens elements in the third lens group;

$r_{III}$ represents the radius of curvature of the cemented surfaces in the third lens group;

$\Sigma d$ represents the total length of the system along the optical axis; and $r_2$ represents the radius of curvature of the image side surface of the negative meniscus single lens located at the front of the first lens group.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE PREFERRED EMBODIMENTS

Figure 1:
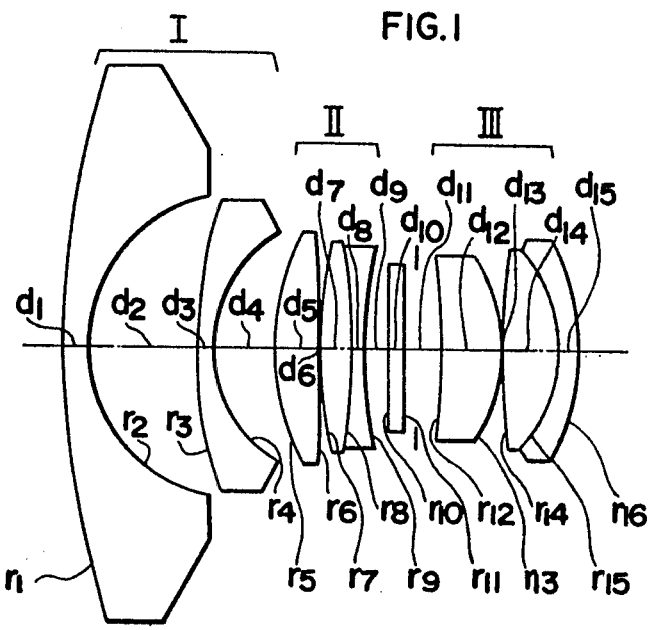
FIGS. 1, 3, 5, 7, 9, 11, 13 and 15 are respectively schematic cross-sectional views of a first through eighth embodiment of the present invention.

The following description is provided to enable any person skilled in the optical art to make and use the invention and sets forth the best modes contemplated by the inventor of carrying out his invention. Various modifications, however, will remain readily apparent to those skilled in the art, since the generic principles of the present invention have been defined specifically to provide an improved high speed fish eye lens system.

The derivation of the formulae and the relationships set forth herein can be accomplished with the assistance of a computer. The present invention represents the parameters of a compromised balance of acceptable aberrations in a relatively easily manufactured and low cost lens system for utilization for example, with a single lens reflex camera.

In each of the schematic cross-sectional views in the Figures, the lens groups have been designated by a roman numeral to simply establish the first, second and third lens groups that are traditionally associated with the design of a fish eye lens system.

The improved fish eye lens system of the present invention provides an optimized optical lens design for the choice of certain parameters set forth herein to solve the problems of spherical and lateral chromatic aberration, distortion and astigmatism that is experienced with a field angle of 180°. Each of the embodiments of the present invention provides an aperture ratio of F/2.8 and a back focal length of slightly greater than two times the focal length of the system. Further, each of the embodiments are particularly adapted for use on a compact 35 mm SLR camera.

With reference to the schematic cross-sectional views of the embodiments of the present invention, it can be seen that a minimum number of lenses are utilized to accomplish the purpose of the present invention. The lenses are further designated in groups with a first lens group, I, and a second lens group, II, positioned on the object side of a diaphragm while a third lens group, III, is positioned on the image side of the diaphragm. As can be seen from the Figures a filter element can be positioned in the lens system such as before the diaphragm and can be either statically positioned within the fish eye lens system or capable of being optionally changed, as desired.

The Tables provided herein will establish the particular dimensions and parameters of the individual lens elements that make up each of the improved fish eye lens systems in such a manner that anyone skilled in the optical arts can reproduce the invention.

As shown more specifically in FIGS. 1, 3, 5, 7, 9, 11, 13 and 15, the fish eye lens system of the present invention comprises, in each of the embodiments, a first lens group, I, of a negative refractive power consisting of two negative mensicus single lenses each being convex to the object side; a second lens group, II, of a positive refractive power including at least a doublet having an intermediate cemented surface and a third lens group, III, of a positive refractive power including at least a positive meniscus single lens convex to the image side and a doublet having an intermediate cemented surface.

The inventive lens system of each of the embodiments can be further defined by the following conditions or parameters as follows:

$$0.5 < |f_I|/f < 0.8 \quad (1)$$
$$1.5 < f_{II}/f < 2.8 \quad (2)$$
$$8.0 < \bar{v}_N - \bar{v}_P < 25.0 \quad (3)$$
$$0.7 < |r_{II}|/f < 3.5 \quad (4)$$
$$0.18 < \bar{N}_N - \bar{N}_P < 0.36 \quad (5)$$
$$0.6 < |r_{III}|/f < 1.7 \quad (6)$$
$$2.2 < \Sigma d/f < 3.2 \quad (7)$$
$$0.65 < r_2/f < 0.92 \quad (8)$$

wherein;

f represents the focal length of the whole lens system;

$f_I$ represents the focal length of the first lens group, I;

$f_{II}$ represents the focal length of the second lens group, II;

$\bar{v}_P$ represents the average Abbe number for the glass material of the positive lens elements in the second lens group, II;

$\bar{v}_N$ represents the average Abbe number for the glass material of the negative lens elements in the second lens group, II;

$r_{II}$ represents the radius of curvature in the cemented surface in the second lens group, II;

$\bar{N}_P$ represents the average of the refractive indices of the glass material for the positive lens elements in the third lens group, III;

$\bar{N}_N$ represents the average of the refractive indices of the glass material for the negative lens elements in the third lens group, III;

$r_{III}$ represents the radius of curvature of the cemented surfaces in the third lens group, III;

$\Sigma d$ represents the total length of the lens systems along the optical axis; and $r_2$ represents the radius of curvature of the image side surface of the negative meniscus single lens located at the front of the first lens group, I.

With respect to the above parameters, condition (1) is required to secure a sufficient back focal length and further for minimizing the diameter of the front lens element with appropriate off-axial ray aberration correction. If the upper limit of this condition is not maintained, the back focal length will be too short to be used in a single lens reflex camera and the diameter of the front lens element would have to be enlarged for securing the entrance of the necessary light rays within the field angle of 180°. If the ratio is below 0.5, the desired back focal length can still be accomplished. However, it becomes necessary to provide an excessive correction of the Petzval sum in the second and third lens groups which results in an extreme generation of astigmatism and coma that for all practical purposes is incapable of being corrected in any desirable lens system configuration.

The second condition (2) relates to condition (1) and if its lower limit is not maintained, an excessively short back focal length and an extremely great diameter of the front lens element will result. If, however, the upper limit is not maintained then the astigmatism and coma generated in the first lens group cannot be adequately corrected.

As is well recognized by optical lens designers, and correction of chromatic aberration in a fish eye lens system is of great importance in maintaining the desired image performance of the lens system. According to the conventional technique in designing a reversed telephoto type lens system, the lateral chromatic aberration should be largely corrected by means of the second lens group and the longitudinal chromatic aberration is mainly corrected by means of the third lens group. While the present invention utilizes these lens groups to achieve the chromatic aberration correction, it should be specifically noted that the combination of conditions (3) and (4) of the present invention makes it possible to correct lateral chromatic aberrations even in those cases where the difference between the Abbe numbers for positive and negative lens elements in the second lens group $\bar{v}_N - \bar{v}_P$, is relatively small. If the lower limit of condition (3) is violated, the lateral chromatic aberration is difficult to be corrected. Any decreasing of the radius of curvature, $r_{II}$, will not solve this problem. An excessive difference between the Abbe number resulting in a value above the upper limit of condition (3), however, results in an over correction of lateral chromatic aberration and an under correction of longitudinal chromatic aberration. This particular unbalanced correction of chromatic aberration is incapable of being improved with the practical commercially available glass materials that can be utilized in the third lens group, III.

The parameters of conditions (5) and (6) are designed to permit the correction of astigmatism by effectively cancelling the negative deviation of the Petzval sum caused by the first lens group, I, and thereby sets the Petzval sum of the lens system positive. Additionally, desirable correction of field curvature, astigmatism and coma cannot be achieved outside the range of conditions (5) and (6).

The optical designer using conditions (7) and (8) is capable of maintaining the compactness of the lens system including the diameter of front lens element while still achieving the lens design performance of the present invention. Condition (7) discloses the range of the shortened total length of the lens system along the optical axis relative to the focal length of the lens system. Condition (8) is related to condition (1). Because of the relatively short radius of curvature, $v_2$, within the numerical value of the range of condition (8), the diameter of the front lens element will be maintained at a minimum size.

In each of the aforementioned schematic figures, a filter element may be located between the second lens group, II, and the third lens group, III, if desired. The filter element is movable between two positions in and out of the light path of the lens system. Alternatively, the location of the filter element can be between the second and third lens group, within the second lens group, II, or even within or behind the third lens group, III.

In the accompanying drawings which supplement the following Tables, the lenses in accordance with the present invention are illustrated diagrammatically with light assumed to travel from left to right. The radii of curvature of the lenses are indicated by, r, with a subscript corresponding to the consecutive numbers of the lens element surfaces. The axial spacings, d, along the optical axis include both the axis spacings between the lens elements and thickness of the lens elements.

In the Tables, the minus signs indicate surfaces concave toward the object side, while the surfaces without the sign are convex toward the object side. The Tables also disclose the axial spacings, d, along the optical axis. The axial spacings between the lens elements are positioned accordingly, relative to the radii, r, in the Tables, while the thicknesses are designated accordingly, between the radii. Zero axial spacing indicates lens elements cemented to each other. All other axial spacing greater than zero refer to air spacings.

All linear dimensions are given in absolute values and are given with reference to the equivalent focal length of unity. The Tables also provide with respect to each example, the intended relative aperture, the total angle of view, $2\omega$, the back focus or back focal length, with reference to an object at infinity, the refractive index and the Abbe number.

Figure 2A:
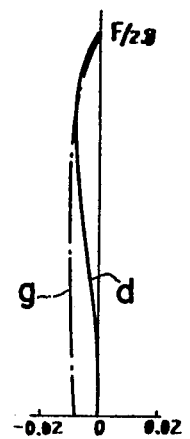
FIGS. 2, 4, 6, 8, 10, 12, 14 and 16 are respectively graphical plots of spherical aberration, astigmatism and distortion for each preceding first through eighth embodiment.
Figure 2B:
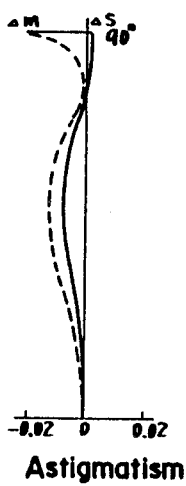
Figure 2C:
Figure 3:
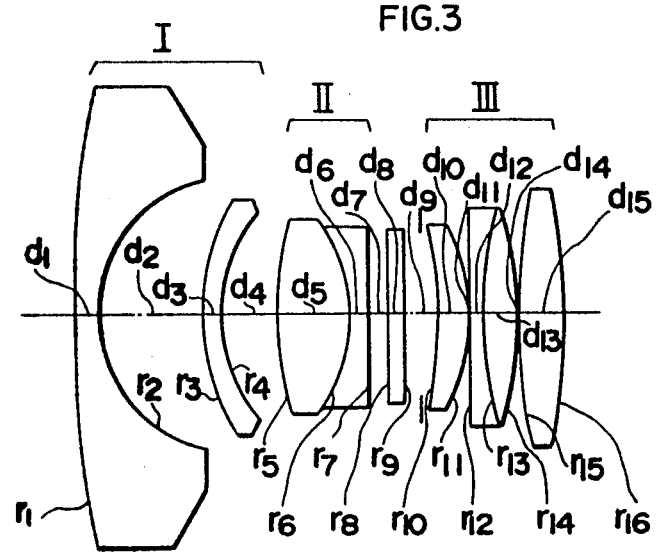
Figure 4A:
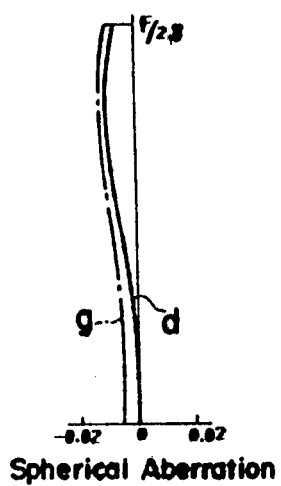
Figure 4B:
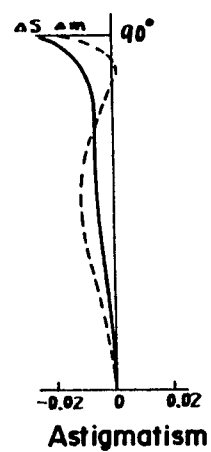
Figure 4C:
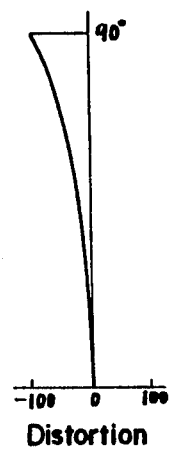
Figure 5:
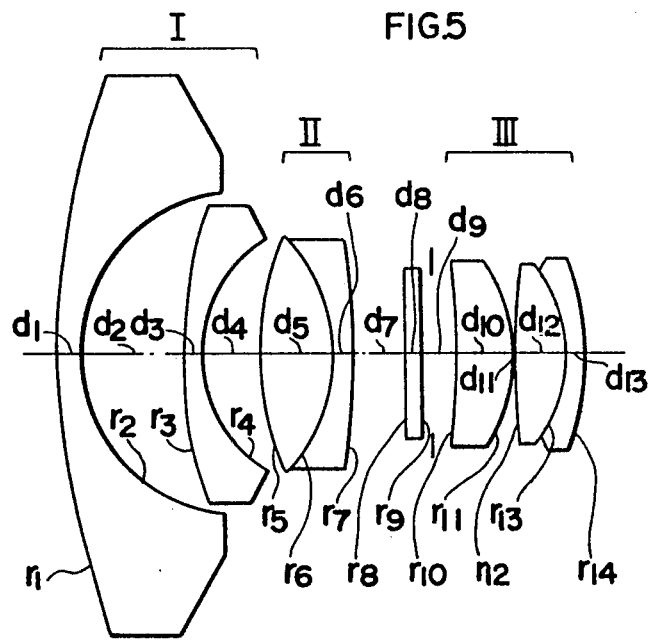
Figure 6A:
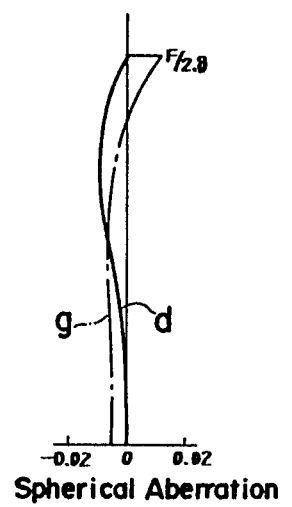
Figure 6B:
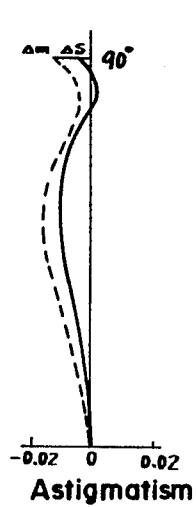
Figure 6C:
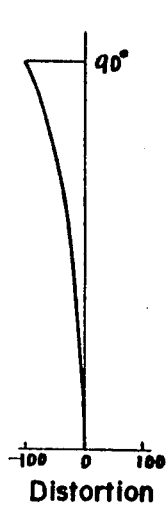
Figure 7:
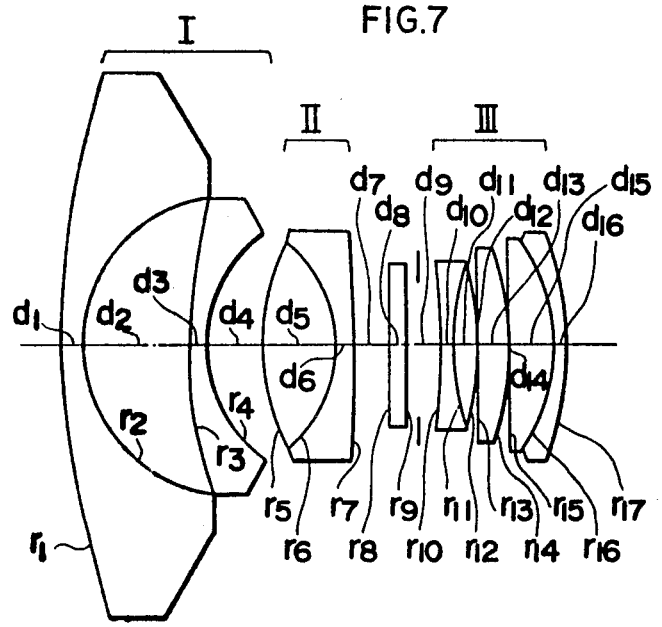
Figure 8A:
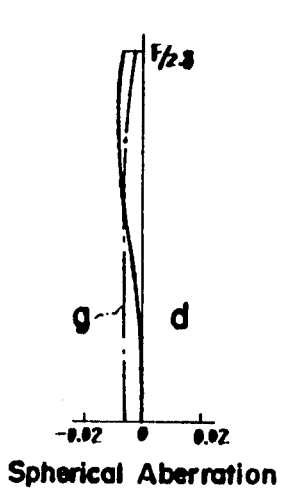
Figure 8B:
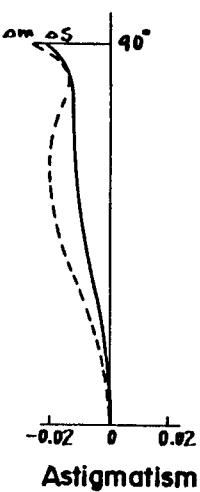
Figure 8C:
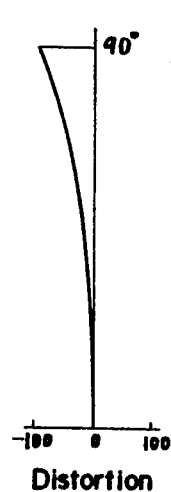
Figure 9:
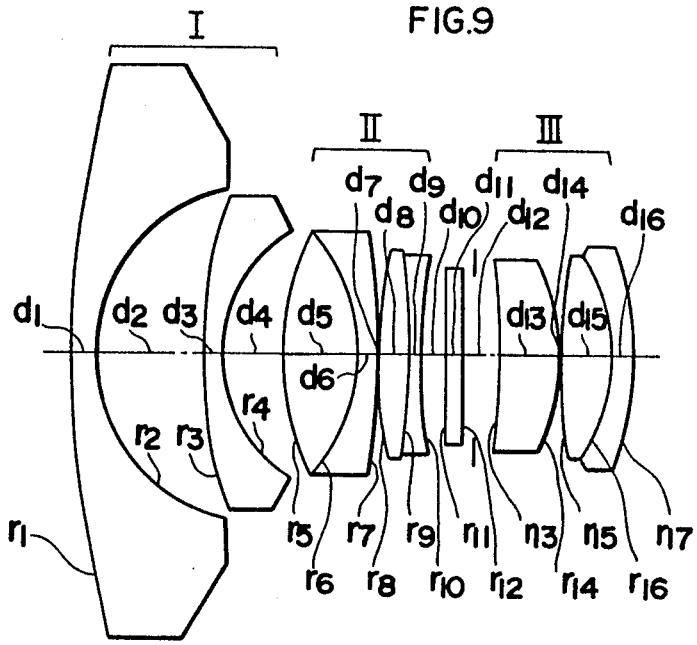
Figure 10A:
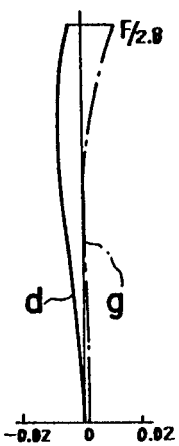
Figure 10B:
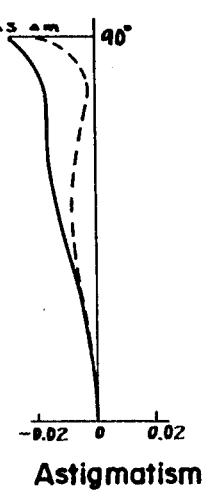
Figure 10C:
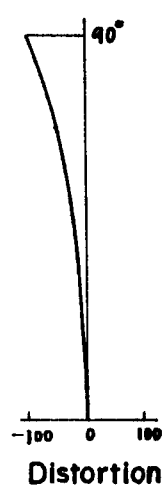
Figure 11:
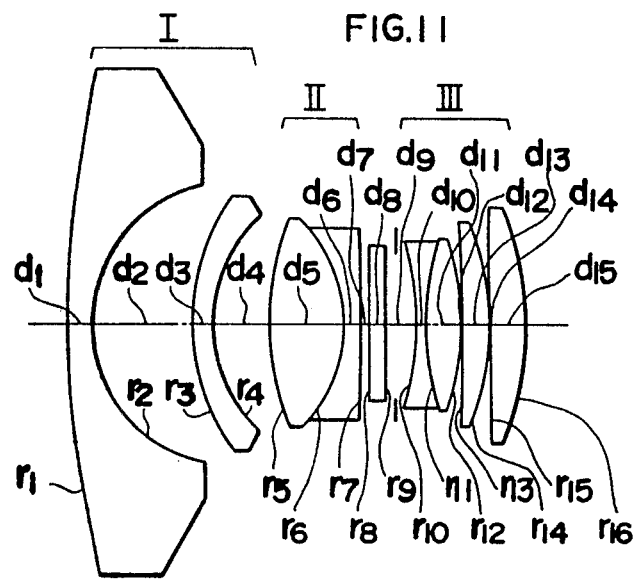
Figure 12A:
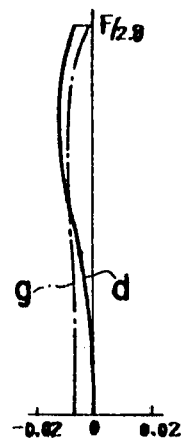
Figure 12B:
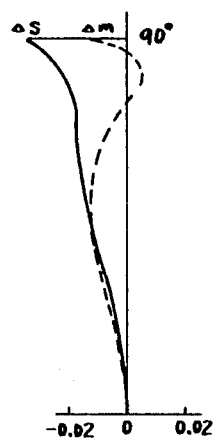
Figure 12C:
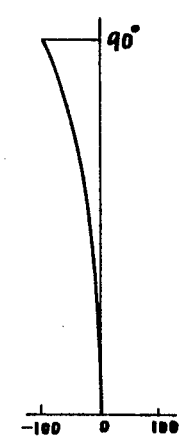
Figure 13:
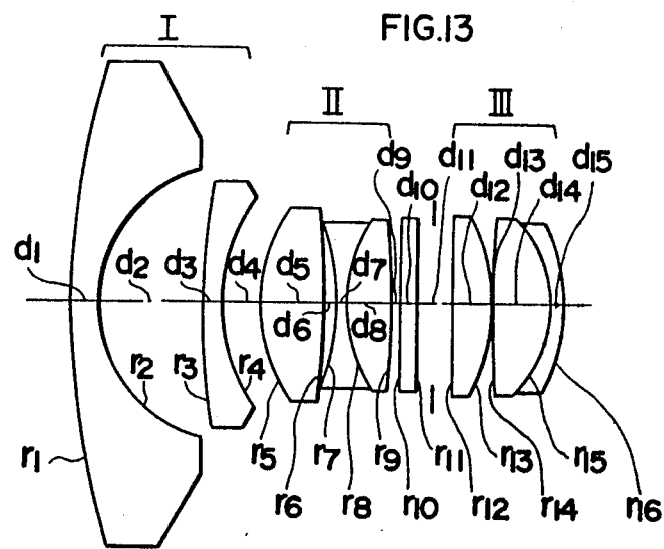
Figure 14A:
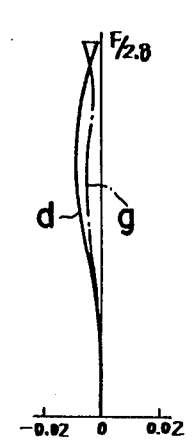
Figure 14B:
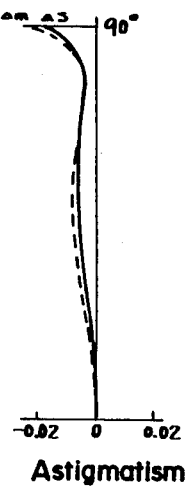
Figure 14C:
Figure 15:
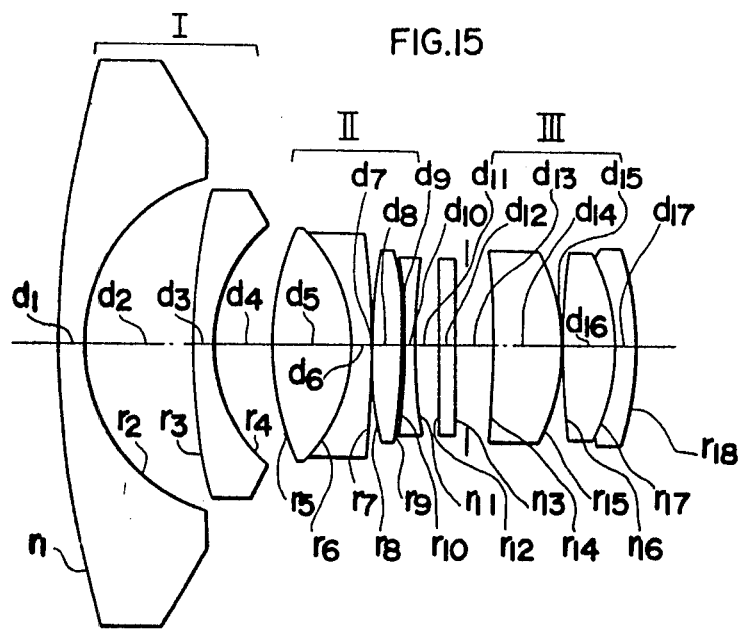
Figure 16A:
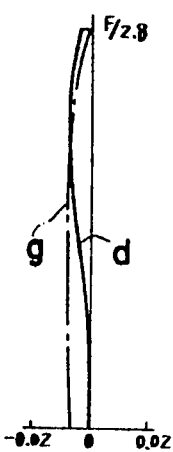
Figure 16B:
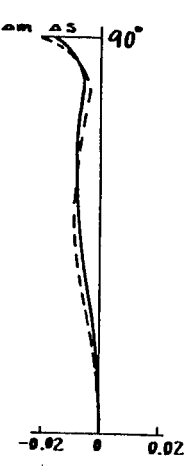
Figure 16C:
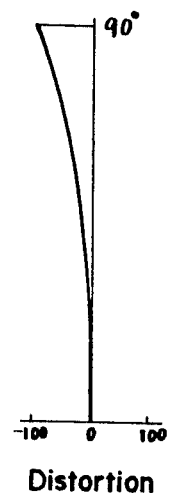

Each of the Tables are described relative to a specific embodiment of the invention and relate directly to a Figure. For example, Table 1 relates to embodiment 1 and FIG. 1 with the spherical aberration being set forth in FIG. 2a, asgitmatism in FIG. 2b and distortion in FIG. 2c. Likewise, FIG. 3 relates to embodiment 2 as set forth in Table 2. Correspondingly, the aberrations of embodiment 2 are set forth in FIGS. 4a, 4b and 4c. The other Tables, embodiments and Figures are likewise related in sequential order.

TABLE 1

Embodiment 1
$f = 1$  $F_{No.} = 2.8$  $2\omega = 180°$  Back Focal Length = 2.324

| | Radius of Curvature | | Axial Distance | | Refractive Index | | Abbe Number |
|---|---|---|---|---|---|---|---|
| $r_1$ | 4.7033 | | | | | | |
| | | $d_1$ | 0.1305 | $N_1$ | 1.71300 | $v_1$ | 53.93 |
| $r_2$ | 0.8146 | | | | | | |
| | | $d_2$ | 0.5754 | | | | |
| $r_3$ | 2.3433 | | | | | | |
| | | $d_3$ | 0.0979 | $N_2$ | 1.62041 | $v_2$ | 60.29 |
| $r_4$ | 0.7204 | | | | | | |
| | | $d_4$ | 0.3269 | | | | |
| $r_5$ | 1.4258 | | | | | | |
| | | $d_5$ | 0.2510 | $N_3$ | 1.71736 | $v_3$ | 29.42 |
| $r_6$ | −8.7833 | | | | | | |
| | | $d_6$ | 0.0063 | | | | |
| $r_7$ | 2.8016 | | | | | | |
| | | $d_7$ | 0.1632 | $N_4$ | 1.59551 | $v_4$ | 39.44 |
| $r_8$ | −3.3885 | | | | | | |
| | | $d_8$ | 0.0653 | $N_5$ | 1.74400 | $v_5$ | 44.90 |
| $r_9$ | 2.8217 | | | | | | |
| | | $d_9$ | 0.1305 | | | | |
| $r_{10}$ | ∞ | | | | | | |
| | | $d_{10}$ | 0.0916 | $N_6$ | 1.51860 | $v_6$ | 60.10 |
| $r_{11}$ | ∞ | | | | | | |
| | | $d_{11}$ | 0.1958 | | | | |
| $r_{12}$ | −4.4012 | | | | | | |
| | | $d_{12}$ | 0.3269 | $N_7$ | 1.49700 | $v_7$ | 81.60 |
| $r_{13}$ | −0.9403 | | | | | | |
| | | $d_{13}$ | 0.0063 | | | | |
| $r_{14}$ | 3.7044 | | | | | | |
| | | $d_{14}$ | 0.2943 | $N_8$ | 1.48749 | $v_8$ | 70.15 |
| $r_{15}$ | −0.7556 | | | | | | |
| | | $d_{15}$ | 0.0916 | $N_9$ | 1.84666 | $v_9$ | 23.88 |
| $r_{16}$ | −1.4548 | | | | | | |

TABLE 2

Embodiment 2
$f = 1$  $F_{No.} = 2.8$  $2\omega = 180°$  Back Focal Length = 2.418

| | Radius of Curvature | | Axial Distance | | Refractive Index | | Abbe Number |
|---|---|---|---|---|---|---|---|
| $r_1$ | 6.9312 | | | | | | |
| | | $d_1$ | 0.1281 | $N_1$ | 1.71300 | $v_1$ | 53.93 |
| $r_2$ | 0.7342 | | | | | | |
| | | $d_2$ | 0.5700 | | | | |
| $r_3$ | 1.1931 | | | | | | |
| | | $d_3$ | 0.0961 | $N_2$ | 1.61800 | $v_2$ | 63.38 |
| $r_4$ | 0.7488 | | | | | | |
| | | $d_4$ | 0.3202 | | | | |
| $r_5$ | 1.7392 | | | | | | |
| | | $d_5$ | 0.4163 | $N_3$ | 1.60342 | $v_3$ | 38.01 |
| $r_6$ | −0.8257 | | | | | | |
| | | $d_6$ | 0.0961 | $N_4$ | 1.61762 | $v_4$ | 52.65 |
| $r_7$ | −17.467 | | | | | | |
| | | $d_7$ | 0.0961 | | | | |
| $r_8$ | ∞ | | | | | | |
| | | $d_8$ | 0.0897 | $N_5$ | 1.51860 | $v_5$ | 60.10 |
| $r_9$ | ∞ | | | | | | |
| | | $d_9$ | 0.1921 | | | | |
| $r_{10}$ | −2.3002 | | | | | | |
| | | $d_{10}$ | 0.1665 | $N_6$ | 1.48749 | $v_6$ | 70.15 |
| $r_{11}$ | −1.1058 | | | | | | |
| | | $d_{11}$ | 0.0064 | | | | |
| $r_{12}$ | −43.146 | | | | | | |
| | | $d_{12}$ | 0.0640 | $N_7$ | 1.80518 | $v_7$ | 25.43 |
| $r_{13}$ | 1.6206 | | | | | | |
| | | $d_{13}$ | 0.1921 | $N_8$ | 1.51680 | $v_8$ | 64.12 |
| $r_{14}$ | −1.7648 | | | | | | |
| | | $d_{14}$ | 0.0064 | | | | |
| $r_{15}$ | 2.9724 | | | | | | |
| | | $d_{15}$ | 0.2562 | $N_9$ | 1.48749 | $v_9$ | 70.15 |

TABLE 2-continued

Embodiment 2
f = 1  $F_{No.}$ = 2.8  $2\omega$ = 180°  Back Focal Length = 2.418

| Radius of Curvature | Axial Distance | Refractive Index | Abbe Number |
|---|---|---|---|
| $r_{16}$  −3.3007 | | | |

TABLE 3

Embodiment 3
f = 1  $F_{No.}$ = 2.8  $2\omega$ = 180°  Back Focal Length = 2.391

| Radius of Curvature | Axial Distance | Refractive Index | Abbe Number |
|---|---|---|---|
| $r_1$   4.3002 | | | |
| | $d_1$  0.1308 | $N_1$  1.71300 | $\nu_1$  53.93 |
| $r_2$   0.8749 | | | |
| | $d_2$  0.5754 | | |
| $r_3$   2.5251 | | | |
| | $d_3$  0.0981 | $N_2$  1.61800 | $\nu_2$  63.38 |
| $r_4$   0.7493 | | | |
| | $d_4$  0.3269 | | |
| $r_5$   1.5718 | | | |
| | $d_5$  0.4250 | $N_3$  1.59551 | $\nu_3$  39.44 |
| $r_6$  −0.9368 | | | |
| | $d_6$  0.0981 | $N_4$  1.61800 | $\nu_4$  63.38 |
| $r_7$  −5.1408 | | | |
| | $d_7$  0.2864 | | |
| $r_8$   ∞ | | | |
| | $d_8$  0.0915 | $N_5$  1.51860 | $\nu_5$  60.10 |
| $r_9$   ∞ | | | |
| | $d_9$  0.1961 | | |
| $r_{10}$  −4.9875 | | | |
| | $d_{10}$  0.3269 | $N_6$  1.49700 | $\nu_6$  81.60 |
| $r_{11}$  −0.9931 | | | |
| | $d_{11}$  0.0065 | | |
| $r_{12}$   3.8522 | | | |
| | $d_{12}$  0.2942 | $N_7$  1.48749 | $\nu_7$  70.15 |
| $r_{13}$  −0.8112 | | | |
| | $d_{13}$  0.0915 | $N_8$  1.80518 | $\nu_8$  25.43 |
| $r_{14}$  −1.7327 | | | |

TABLE 4

Embodiment 4
f = 1  $F_{No.}$ = 2.8  $2\omega$ = 180°  Back Focal Length = 2.376

| Radius of Curvature | Axial Distance | Refractive Index | Abbe Number |
|---|---|---|---|
| $r_1$   4.4152 | | | |
| | $d_1$  0.1308 | $N_1$  1.71300 | $\nu_1$  53.93 |
| $r_2$   0.7993 | | | |
| | $d_2$  0.5754 | | |
| $r_3$   2.3789 | | | |
| | $d_3$  0.0981 | $N_2$  1.61800 | $\nu_2$  63.38 |
| $r_4$   0.7901 | | | |
| | $d_4$  0.3269 | | |
| $r_5$   1.2916 | | | |
| | $d_5$  0.4250 | $N_3$  1.59551 | $\nu_3$  39.44 |
| $r_6$  −0.7460 | | | |
| | $d_6$  0.0981 | $N_4$  1.61800 | $\nu_4$  63.38 |
| $r_7$  −7.6734 | | | |
| | $d_7$  0.1961 | | |
| $r_8$   ∞ | | | |
| | $d_8$  0.0915 | $N_5$  1.51860 | $\nu_5$  60.10 |
| $r_9$   ∞ | | | |
| | $d_9$  0.1961 | | |
| $r_{10}$  −3.5297 | | | |
| | $d_{10}$  0.0654 | $N_6$  1.71736 | $\nu_6$  29.42 |
| $r_{11}$   1.1708 | | | |
| | $d_{11}$  0.1308 | $N_7$  1.62041 | $\nu_7$  60.29 |
| $r_{12}$  −1.7175 | | | |
| | $d_{12}$  0.0065 | | |
| $r_{13}$  −23.998 | | | |
| | $d_{13}$  0.1635 | $N_8$  1.62041 | $\nu_8$  60.29 |
| $r_{14}$  −1.7042 | | | |
| | $d_{14}$  0.0065 | | |
| $r_{15}$   28.172 | | | |
| | $d_{15}$  0.2615 | $N_9$  1.48749 | $\nu_9$  70.15 |
| $r_{16}$  −0.9918 | | | |
| | $d_{16}$  0.0654 | $N_{10}$ 1.80518 | $\nu_{10}$ 25.43 |

TABLE 4-continued

Embodiment 4
f = 1  $F_{No.}$ = 2.8  $2\omega$ = 180°  Back Focal Length = 2.376

| Radius of Curvature | Axial Distance | Refractive Index | Abbe Number |
|---|---|---|---|
| $r_{17}$  −1.6757 | | | |

TABLE 5

Embodiment 5
f = 1  $F_{No.}$ = 2.8  $2\omega$ = 180°  Back Focal Length = 2.365

| Radius of Curvature | Axial Distance | Refractive Index | Abbe Number |
|---|---|---|---|
| $r_1$   5.4137 | | | |
| | $d_1$  0.1305 | $N_1$  1.71300 | $\nu_1$  53.93 |
| $r_2$   0.8952 | | | |
| | $d_2$  0.5754 | | |
| $r_3$   2.7567 | | | |
| | $d_3$  0.0979 | $N_2$  1.62041 | $\nu_2$  60.29 |
| $r_4$   0.7612 | | | |
| | $d_4$  0.3269 | | |
| $r_5$   1.4529 | | | |
| | $d_5$  0.4248 | $N_3$  1.59551 | $\nu_3$  39.44 |
| $r_6$  −0.9234 | | | |
| | $d_6$  0.0979 | $N_4$  1.61762 | $\nu_4$  52.65 |
| $r_7$  −4.4441 | | | |
| | $d_7$  0.0063 | | |
| $r_8$   2.8495 | | | |
| | $d_8$  0.1632 | $N_5$  1.59551 | $\nu_5$  39.44 |
| $r_9$  −3.4232 | | | |
| | $d_9$  0.0653 | $N_6$  1.74400 | $\nu_6$  44.90 |
| $r_{10}$   3.3546 | | | |
| | $d_{10}$  0.1305 | | |
| $r_{11}$   ∞ | | | |
| | $d_{11}$  0.0916 | $N_7$  1.51860 | $\nu_7$  60.10 |
| $r_{12}$   ∞ | | | |
| | $d_{12}$  0.1958 | | |
| $r_{13}$  −5.6068 | | | |
| | $d_{13}$  0.3269 | $N_8$  1.49700 | $\nu_8$  81.60 |
| $r_{14}$  −1.0073 | | | |
| | $d_{14}$  0.0063 | | |
| $r_{15}$   3.2416 | | | |
| | $d_{15}$  0.2943 | $N_9$  1.48749 | $\nu_9$  70.15 |
| $r_{16}$  −0.8347 | | | |
| | $d_{16}$  0.0916 | $N_{10}$ 1.84666 | $\nu_{10}$ 23.88 |
| $r_{17}$  −1.6847 | | | |

TABLE 6

Embodiment 6
f = 1  $F_{No.}$ = 2.8  $2\omega$ = 180°  Back Focal Length = 2.314

| Radius of Curvature | Axial Distance | Refractive Index | Abbe Number |
|---|---|---|---|
| $r_1$   5.3911 | | | |
| | $d_1$  0.1236 | $N_1$  1.71300 | $\nu_1$  53.93 |
| $r_2$   0.7271 | | | |
| | $d_2$  0.5437 | | |
| $r_3$   1.2077 | | | |
| | $d_3$  0.0927 | $N_2$  1.61800 | $\nu_2$  63.38 |
| $r_4$   0.7730 | | | |
| | $d_4$  0.3089 | | |
| $r_5$   1.2695 | | | |
| | $d_5$  0.4016 | $N_3$  1.59551 | $\nu_3$  39.44 |
| $r_6$  −0.7588 | | | |
| | $d_6$  0.0927 | $N_4$  1.61800 | $\nu_4$  63.38 |
| $r_7$  −6.3137 | | | |
| | $d_7$  0.0309 | | |
| $r_8$   ∞ | | | |
| | $d_8$  0.0865 | $N_5$  1.51860 | $\nu_5$  60.10 |
| $r_9$   ∞ | | | |
| | $d_9$  0.1544 | | |
| $r_{10}$  −1.8331 | | | |
| | $d_{10}$  0.0618 | $N_6$  1.80518 | $\nu_6$  25.43 |
| $r_{11}$   1.4365 | | | |
| | $d_{11}$  0.1853 | $N_7$  1.51680 | $\nu_7$  64.12 |
| $r_{12}$  −1.3977 | | | |
| | $d_{12}$  0.0062 | | |
| $r_{13}$  −14.806 | | | |
| | $d_{13}$  0.1359 | $N_8$  1.62041 | $\nu_8$  60.29 |
| $r_{14}$  −1.5592 | | | |

TABLE 6-continued

Embodiment 6
$f = 1$  $F_{No.} = 2.8$  $2\omega = 180°$  Back Focal Length = 2.314

| Radius of Curvature | Axial Distance | Refractive Index | Abbe Number |
|---|---|---|---|
| | $d_{14}$ 0.0062 | | |
| $r_{15}$ 17.990 | | | |
| | $d_{15}$ 0.1853 | $N_9$ 1.62041 | $\nu_9$ 60.29 |
| $r_{16}$ −1.7560 | | | |

TABLE 7

Embodiment 7
$f = 1$  $F_{No.} = 2.8$  $2\omega = 180°$  Back Focal Length = 2.241

| Radius of Curvature | Axial Distance | Refractive Index | Abbe Number |
|---|---|---|---|
| $r_1$ 4.1794 | | | |
| | $d_1$ 0.1308 | $N_1$ 1.71300 | $\nu_1$ 53.93 |
| $r_2$ 0.6823 | | | |
| | $d_2$ 0.5753 | | |
| $r_3$ 3.4280 | | | |
| | $d_3$ 0.0981 | $N_2$ 1.62041 | $\nu_2$ 60.29 |
| $r_4$ 0.7840 | | | |
| | $d_4$ 0.2162 | | |
| $r_5$ 0.9605 | | | |
| | $d_5$ 0.3460 | $N_3$ 1.66892 | $\nu_3$ 45.01 |
| $r_6$ −2.6786 | | | |
| | $d_6$ 0.0432 | | |
| $r_7$ −1.5868 | | | |
| | $d_7$ 0.0618 | $N_4$ 1.69350 | $\nu_4$ 51.83 |
| $r_8$ 0.7823 | | | |
| | $d_8$ 0.2471 | $N_5$ 1.66755 | $\nu_5$ 41.98 |
| $r_9$ −3.4689 | | | |
| | $d_9$ 0.0309 | | |
| $r_{10}$ ∞ | | | |
| | $d_{10}$ 0.0927 | $N_6$ 1.51860 | $\nu_6$ 60.10 |
| $r_{11}$ ∞ | | | |
| | $d_{11}$ 0.1853 | | |
| $r_{12}$ −52.857 | | | |
| | $d_{12}$ 0.2101 | $N_7$ 1.49700 | $\nu_7$ 81.60 |
| $r_{13}$ −1.1380 | | | |
| | $d_{13}$ 0.0062 | | |
| $r_{14}$ 6.6122 | | | |
| | $d_{14}$ 0.3089 | $N_8$ 1.48749 | $\nu_8$ 70.15 |
| $r_{15}$ −0.6350 | | | |
| | $d_{15}$ 0.0618 | $N_9$ 1.80518 | $\nu_9$ 25.43 |
| $r_{16}$ −1.2749 | | | |

TABLE 8

Embodiment 8
$f = 1$  $F_{No.} = 2.8$  $2\omega = 180°$  Back Focal Length = 2.369

| Radius of Curvature | Axial Distance | Refractive Index | Abbe Number |
|---|---|---|---|
| $r_1$ 5.4900 | | | |
| | $d_1$ 0.1308 | $N_1$ 1.71300 | $\nu_1$ 53.93 |
| $r_2$ 0.9129 | | | |
| | $d_2$ 0.5754 | | |
| $r_3$ 2.9563 | | | |
| | $d_3$ 0.0981 | $N_2$ 1.62041 | $\nu_1$ 60.29 |
| $r_4$ 0.7641 | | | |
| | $d_4$ 0.3269 | | |
| $r_5$ 1.4370 | | | |
| | $d_5$ 0.4250 | $N_3$ 1.59551 | $\nu_3$ 39.44 |
| $r_6$ −0.8910 | | | |
| | $d_6$ 0.0981 | $N_4$ 1.61762 | $\nu_4$ 52.65 |
| $r_7$ −5.7603 | | | |
| | $d_7$ 0.0066 | | |
| $r_8$ 2.8357 | | | |
| | $d_8$ 0.1569 | $N_5$ 1.59551 | $\nu_5$ 39.44 |
| $r_9$ −3.1139 | | | |
| | $d_9$ 0.0129 | | |
| $r_{10}$ −3.2992 | | | |
| | $d_{10}$ 0.0523 | $N_6$ 1.71060 | $\nu_6$ 43.25 |
| $r_{11}$ 3.2996 | | | |
| | $d_{11}$ 0.1274 | | |
| $r_{12}$ ∞ | | | |
| | $d_{12}$ 0.0916 | $N_7$ 1.51860 | $\nu_7$ 60.10 |
| $r_{13}$ ∞ | | | |
| | $d_{13}$ 0.1962 | | |
| $r_{14}$ −6.0974 | | | |
| | $d_{14}$ 0.3641 | $N_8$ 1.49700 | $\nu_8$ 81.60 |
| $r_{15}$ −1.0247 | | | |
| | $d_{15}$ 0.0066 | | |
| $r_{16}$ 3.1347 | | | |
| | $d_{16}$ 0.2943 | $N_9$ 1.48749 | $\nu_9$ 70.15 |
| $r_{17}$ −0.8274 | | | |
| | $d_{17}$ 0.0916 | $N_{10}$ 1.80518 | $\nu_{10}$ 25.43 |
| $r_{18}$ −1.7774 | | | |

The preceding Tables 1 through 8 disclose the eight embodiments of the present invention which more than adequately establish the truthfulness of the recited ranges of conditions. Simply for the purposes of summarizing the parameters of these eight embodiments, the following Table 9 is provided.

TABLE 9

| Embodiment | $|f_I|/f$ | $f_{II}/f$ | $\bar{\nu}_N - \bar{\nu}_P$ | $|r_{II}|/f$ | $\bar{N}_N - \bar{N}_P$ | $|r_{III}|/f$ | $\Sigma d/f$ | $r_2/f$ |
|---|---|---|---|---|---|---|---|---|
| 1 | 0.6386 | 1.9126 | 10.47 | 3.39 | 0.354 | 0.76 | 2.7535 | 0.8146 |
| 2 | 0.7569 | 2.7565 | 14.64 | 0.83 | 0.308 | 1.62 | 2.6963 | 0.7342 |
| 3 | 0.6944 | 2.1609 | 23.94 | 0.94 | 0.313 | 0.81 | 2.9474 | 0.8749 |
| 4 | 0.6809 | 1.9875 | 23.94 | 0.75 | 0.185 | 1.71($r_{11}$) 0.99($r_{16}$) | 2.8106 | 0.7993 |
| 5 | 0.6752 | 2.0632 | 8.89 | 0.92($r_6$) 3.42($r_9$) | 0.354 | 0.83 | 3.0251 | 0.8952 |
| 6 | 0.7938 | 1.8983 | 23.94 | 0.76 | 0.219 | 1.44 | 2.4157 | 0.7271 |
| 7 | 0.5575 | 1.5035 | 8.34 | 0.78 | 0.313 | 0.64 | 2.6144 | 0.6823 |
| 8 | 0.6757 | 2.0651 | 13.21 | 0.89 | 0.313 | 0.83 | 3.0548 | 0.9129 |

As can be readily appreciated, it is possible to deviate from the above embodiments of the present invention and as will be readily understood by those skilled in the art, the invention is capable of many modifications and improvements within the scope and spirit thereof. Accordingly, it will be understood that the invention is not limited by the specific disclosed embodiments, but only by the scope and spirit of the appended claims.

What is claimed is:

1. An improved fish eye lens system comprising from the object to the image side:
   a first lens group of a negative refractive power consisting of two negative meniscus single lenses each being convex to the object side;
   a second lens group of a positive refractive power including at least a doublet having an intermediate cemented surface; and
   a third lens group of a positive refractive power including at least a positive meniscus single lens, convex to the image side, and a doublet having an intermediate cemented surface, wherein the lens system fulfills the following conditions:

| | | | | |
|---|---|---|---|---|
| 0.5 | < | $\|f_I\|/f$ | < | 0.8 |
| 1.5 | < | $f_{II}/f$ | < | 2.8 |
| 8.0 | < | $\bar{\nu}_N - \bar{\nu}_P$ | < | 25.0 |
| 0.7 | < | $\|r_{II}\|/f$ | < | 3.5 |
| 0.18 | < | $\bar{N}_N - \bar{N}_P$ | < | 0.36 |
| 0.6 | < | $\|r_{III}\|/f$ | < | 1.7 |
| 2.2 | < | $\Sigma d/f$ | < | 3.2 |
| 0.65 | < | $r_2/f$ | < | 0.92 | wherein;
f represents the focal length of the whole lens system; $f_I$ represents the focal length of the first lens group; $f_{II}$ represents the focal length of the second lens group; $\bar{\nu}_P$ represents the average Abbe number for the glass material of the positive lens elements in the second lens group; $\bar{\nu}_N$ represents the average Abbe number for the glass material of the negative lens elements in the second lens group; $r_{II}$ represents the radius of curvature of the intermediate cemented surface in the second lens group; $\bar{N}_P$ represents the average refractive indices of the glass material for the positive lens elements in the third lens group; $\bar{N}_N$ represents the average refractive indices of the glass material for the negative lens elements in the third lens group; $r_{III}$ represents the radius of curvature of the cemented surfaces in the third lens group; $\Sigma d$ represents the total length of the lens system along the optical axis; and $r_2$ represents the radius of curvature of the image side surface of the negative meniscus single lens located at the front of the first lens group.

2. The invention of claim 1 wherein the second lens group consists of the doublet having its intermediate cemented surface convex to the image side.

3. The invention of claim 2 wherein the third lens group consists of the doublet, the positive meniscus single lens being positioned convex to the image side and located at the image side of the doublet and a second positive single lens located at the image side of the positive meniscus single lens.

4. The invention of claim 1 wherein the third lens group consists of the positive meniscus single lens convex to the image side and the doublet located at the image side of the positive meniscus single lens, the intermediate cemented surface of the doublet being positioned convex to the image side.

5. The invention according to claim 1 further comprising a filter element movable between two positions in and out of the light path of the lens system.

6. An improved fish eye lens system comprising the following design parameters:

| $f = 1$ $F_{No.} = 2.8$ $2\omega = 180°$ Back Focal Length = 2.324 | | | | | | |
|---|---|---|---|---|---|---|
| Radius of Curvature | | Axial Distance | | Refractive Index | | Abbe Number |
| $r_1$ | 4.7033 | | | | | |
| | | $d_1$ | 0.1305 | $N_1$ 1.71300 | $\nu_1$ | 53.93 |
| $r_2$ | 0.8146 | | | | | |
| | | $d_2$ | 0.5754 | | | |
| $r_3$ | 2.3433 | | | | | |
| | | $d_3$ | 0.0979 | $N_2$ 1.62041 | $\nu_2$ | 60.29 |
| $r_4$ | 0.7204 | | | | | |
| | | $d_4$ | 0.3269 | | | |
| $r_5$ | 1.4258 | | | | | |
| | | $d_5$ | 0.2510 | $N_3$ 1.71736 | $\nu_3$ | 29.42 |
| $r_6$ | −8.7833 | | | | | |
| | | $d_6$ | 0.0063 | | | |
| $r_7$ | 2.8016 | | | | | |
| | | $d_7$ | 0.1632 | $N_4$ 1.59551 | $\nu_4$ | 39.44 |
| $r_8$ | −3.3885 | | | | | |
| | | $d_8$ | 0.0653 | $N_5$ 1.74400 | $\nu_5$ | 44.90 |
| $r_9$ | 2.8217 | | | | | |
| | | $d_9$ | 0.1305 | | | |
| $r_{10}$ | ∞ | | | | | |
| | | $d_{10}$ | 0.0916 | $N_6$ 1.51860 | $\nu_6$ | 60.10 |
| $r_{11}$ | ∞ | | | | | |
| | | $d_{11}$ | 0.1958 | | | |
| $r_{12}$ | −4.4012 | | | | | |
| | | $d_{12}$ | 0.3269 | $N_7$ 1.49700 | $\nu_7$ | 81.60 |
| $r_{13}$ | −0.9403 | | | | | |
| | | $d_{13}$ | 0.0063 | | | |
| $r_{14}$ | 3.7044 | | | | | |
| | | $d_{14}$ | 0.2943 | $N_8$ 1.48749 | $\nu_8$ | 70.15 |
| $r_{15}$ | −0.7556 | | | | | |
| | | $d_{15}$ | 0.0916 | $N_9$ 1.84666 | $\nu_9$ | 23.88 |
| $r_{16}$ | −1.4548 | | | | | |

7. An improved fish eye lens system comprising from the object to the image side:
a first lens group of a negative refractive power consisting of two negative meniscus single lenses each being convex to the object side;
a second lens group of a positive refractive power including at least a doublet having an intermediate cemented surface; and
a third lens group of a positive refractive power including at least a doublet having an intermediate cemented surface, wherein the lens system fulfills the following conditions:

| | | | | |
|---|---|---|---|---|
| 2.2 | < | $\Sigma d / f$ | < | 3.2 |
| 0.65 | < | $r_2 / f$ | < | 0.92 |
| 8.0 | < | $\bar{\nu}_N - \bar{\nu}_P$ | < | 25.0 |
| 0.7 | < | $\|r_{II}\|/f$ | < | 3.5 | wherein, f represents the focal length of the whole lens system; $\Sigma d$ represents the total length of the lens system along the optical axis; $r_2$ represents the radius of curvature of the image side surface of the negative meniscus single lens located at the front of the first lens group; $\bar{\nu}_P$ represents the average Abbe number for the glass material of the positive lens elements in the second lens group; $\bar{\nu}_N$ represents the average Abbe number for glass material of the negative lens elements in the second group; and $r_{II}$ represents the radius of curvature of the intermediate cemented surface in the second lens group.

8. The invention of claim 7 wherein the lens system further fulfills the following conditions:

$$1.5 < f_{II}/f < 2.8$$

wherein, $f_{II}$ represents the focal length of the second lens group.

9. The invention of claim 8, wherein the third lens group further includes another doublet having an intermediate cemented surface.

10. The invention of claim 8, wherein the second lens group consists of the doublet and a positive single lens, the intermediate surface of the doublet being positioned convex to the image side.

11. The invention of claim 8, wherein the second lens group consists of the doublet and a positive single lens, the intermediate surface of the doublet being positioned convex to the object side.

12. An improved fish eye lens system comprising from the object to the image side;
   a first lens group of a negative refractive power including two negative meniscus single lenses each being convex to the object side;
   a second lens group of a positive refractive power including at least a doublet having an intermediate cemented surface which is convex to the image side, and
   a third lens group of a positive refractive power consisting of a positive meniscus single lens convex to the image side and a doublet located at the image side of the positive meniscus single lens with an intermediate cemented surface positioned convex to the image side, wherein the lens system fulfills the following conditions:

| | | | | |
|---|---|---|---|---|
| 0.5 | < | $|f_I|/f$ | < | 0.8 |
| 1.5 | < | $f_{II}/f$ | < | 2.8 |
| 8.0 | < | $\bar{v}_N - \bar{v}_P$ | < | 25.0 |
| 0.7 | < | $|r_{II}|/f$ | < | 3.5 |
| 0.18 | < | $\bar{N}_N - \bar{N}_P$ | < | 0.36 |
| 0.6 | < | $|r_{III}|/f$ | < | 1.7 |
| 2.2 | < | $\Sigma d/f$ | < | 3.2 |
| 0.65 | < | $r_2/f$ | < | 0.92 | wherein, f represents the focal length of the whole lens system; $f_I$ represents the focal length of the first lens group; $f_{II}$ represents the focal length of the second lens group; $\bar{v}_P$ represents the average Abbe number for the glass material of the positive lens elements in the second lens group; $\bar{v}_N$ represents the average Abbe number for the glass material of the negative lens elements in the second lens group; $r_{II}$ represents the radius of curvature of the intermediate cemented surface in the second lens group; $\bar{N}_P$ represents the average refractive indices of the glass material for the positive lens elements in the third lens group; $\bar{N}_N$ represents the average refractive indices of the glass material for the negative lens elements in the third lens group; $r_{III}$ represents the radius of curvature of any cemented surfaces in the third lens group; $\Sigma d$ represents the total length of the lens system along the optical axis; and $r_2$ represents the radius of curvature of the image side surface of the negative meniscus single lens located at the front of the first lens group.

13. An improved fish eye lens system comprising from the object to the image side;
   a first lens group of a negative refractive power including two negative meniscus single lenses each being convex to the object side;
   a second lens group of a positive refractive power including at least a doublet having an intermediate cemented surface which is convex to the image side, and
   a third lens group of a positive refractive power consisting of a doublet, a positive meniscus single lens being positioned convex to the image side, the doublet being located at the image side of the positive meniscus single lens and a positive single lens located at the image side of the doublet, wherein the lens system fulfills the following conditions:

| | | | | |
|---|---|---|---|---|
| 0.5 | < | $|f_I|/f$ | < | 0.8 |
| 1.5 | < | $f_{II}/f$ | < | 2.8 |
| 8.0 | < | $\bar{v}_N - \bar{v}_P$ | < | 25.0 |
| 0.7 | < | $|r_{II}|/f$ | < | 3.5 |
| 0.18 | < | $\bar{N}_N - \bar{N}_P$ | < | 0.36 |
| 0.6 | < | $|r_{III}|/f$ | < | 1.7 |
| 2.2 | < | $\Sigma d/f$ | < | 3.2 |
| 0.65 | < | $r_2/f$ | < | 0.92 | wherein, f represents the focal length of the whole lens system; $f_I$ represents the focal length of the first lens group; $f_{II}$ represents the focal length of the second lens group; $\bar{v}_P$ represents the average Abbe number for the glass material of the positive lens elements in the second lens group; $\bar{v}_N$ represents the average Abbe number for the glass material of the negative lens elements in the second lens group; $r_{II}$ represents the radius of curvature of the intermediate cemented surface in the second lens group; $\bar{N}_P$ represents the average refractive indices of the glass material for the positive lens elements in the third lens group; $\bar{N}_N$ represents the average refractive indices of the glass material for the negative lens elements in the third lens group; $r_{III}$ represents the radius of curvature of any cemented surfaces in the third lens group; $\Sigma d$ represents the total length of the lens system along the optical axis; and $r_2$ represents the radius of curvature of the image side surface of the negative meniscus single lens located at the front of the first lens group.

14. An improved fish eye lens system comprising from the object to the image side:
   a first lens group of a negative refractive power including two negative meniscus single lenses each being convex to the object side;
   a second lens group of a positive refractive power including at least a doublet having an intermediate cemented surface which is convex to the image side; and
   a third lens group of a positive refractive power consisting of a first doublet with an intermediate cemented surface, a positive meniscus single lens being positioned convex to the image side and located at the image side of the first doublet with an intermediate cemented surface located at the image side of the positive meniscus single lens, the intermediate cemented surfaces of each of the doublets in the third lens group fulfilling the condition $0.6 < |r_{III}|/f < 1.7$, wherein the lens system fulfills the following conditions:

| | | | | |
|---|---|---|---|---|
| 0.5 | < | $|f_I|/f$ | < | 0.8 |
| 1.5 | < | $f_{II}/f$ | < | 2.8 |
| 8.0 | < | $\bar{v}_N - \bar{v}_P$ | < | 25.0 |
| 0.7 | < | $|r_{II}|/f$ | < | 3.5 |
| 0.18 | < | $\bar{N}_N - \bar{N}_P$ | < | 0.36 |
| 2.2 | < | $\Sigma d/f$ | < | 3.2 |
| .65 | < | $r_2/f$ | < | 0.92 | wherein;
   f represents the focal length of the whole lens system; $f_I$ represents the focal length of the first lens group; $f_{II}$ represents the focal length of the second lens group; $\bar{v}_P$ represents the average Abbe number for the glass material of the positive lens elements in the second lens group; $\bar{v}_N$ represents the average Abbe number for the glass material of the negative lens elements in the second lens group; $r_{II}$ represents the radius of curvature of the intermediate cemented surface in the second lens group; $\bar{N}_P$ represents the average refractive indices of the glass material for the posive lens elements in the third lens group; $\overline{N}_N$ represents the average refractive indices of the glass material for the negative lens elements in the third lens group; $r_{III}$ represents the radius of curvature of any cemented surfaces in the third lens group; $\Sigma d$ represents the total length of the lens system along the optical axis; and $r_2$ represents the radius of curvature of the image side surface of the negative meniscus single lens located at the front of the first lens group.

15. An improved fish eye lens system comprising from the object to the image side:
   a first lens group of a negative refractive power including two negative meniscus single lenses each being convex to the object side;
   a second lens group of a positive refractive power consisting of a positive single lens and a doublet with an intermediate cemented surface located at the image side of the positive single lens, the intermediate cemented surface of the doublet being positioned convex to the image side; and
   a third lens group of a positive refractive power consisting of a positive meniscus single lens convex to the image side and a doublet located at the image side of the positive meniscus single lens with an intermediate cemented surface of the doublet being positioned convex to the image side, wherein the lens system fulfills the following conditions:

| 0.5 | < | $|f_I|/f$ | < | 0.8 |
| 1.5 | < | $f_{II}/f$ | < | 2.8 |
| 8.0 | < | $\overline{v}_N - \overline{v}_P$ | < | 25.0 |
| 0.7 | < | $|r_{II}|/f$ | < | 3.5 |
| 0.18 | < | $\overline{N}_N - \overline{N}_P$ | < | 0.36 |
| 0.6 | < | $|r_{III}|/f$ | < | 1.7 |
| 2.2 | < | $\Sigma d/f$ | < | 3.2 |
| 0.65 | < | $r_2/f$ | < | 0.92 | wherein,
f represents the focal length of the whole lens system; $f_I$ represents the focal length of the first lens group; $f_{II}$ represents the focal length of the second lens group; $\overline{v}_P$ represents the average Abbe number for the glass material of the positive lens elements in the second lens group; $\overline{v}_N$ represents the average Abbe number for the glass material of the negative lens elements in the second lens group; $r_{II}$ represents the radius of curvature of any intermediate cemented surface in the second lens group; $\overline{N}_P$ represents the average refractive indices of the glass material for the positive lens elements in the third lens group; $\overline{N}_N$ represents the average refractive indices of the glass material for the negative lens elements in the third lens group; $r_{III}$ represents the radius of curvature of any cemented surface in the third lens group; $\Sigma d$ represents the total length of the lens system along the optical axis; and $r_2$ represents the radius of curvature of the image side surface of the negative meniscus single lens located at the front of the first lens group.

16. An improved fish eye lens system comprising from the object to the image side:
   a first lens group of a negative refractive power including two negative meniscus single lenses each being convex to the object side;
   a second lens group of a positive refractive power consisting of a positive single lens and a doublet with an intermediate cemented surface, convex to the object side, the doublet is located at the image side of the positive single lens; and
   a third lens group of a positive refractive power consisting of a positive meniscus single lens convex to the image side and a doublet located at the image side of the positive meniscus single lens with an intermediate cemented surface of the doublet being positioned convex to the image side, wherein the lens system fulfills the following conditions;

| 0.5 | < | $|f_I|/f$ | < | 0.8 |
| 1.5 | < | $f_{II}/f$ | < | 2.8 |
| 8.0 | < | $\overline{v}_N - \overline{v}_P$ | < | 25.0 |
| 0.7 | < | $|r_{II}|/f$ | < | 3.5 |
| 0.18 | < | $\overline{N}_N - \overline{N}_P$ | < | 0.36 |
| 0.6 | < | $|r_{III}|/f$ | < | 1.7 |
| 2.2 | < | $\Sigma d/f$ | < | 3.2 |
| 0.65 | < | $r_2/f$ | < | 0.92 | wherein,
f represents the focal length of the whole lens system; $f_I$ represents the focal length of the first lens group; $f_{II}$ represents the fcal length of the second lens group; $\overline{v}_P$ represents the average Abbe number for the glass material of the positive lens elements in the second lens group; $\overline{v}_N$ represents the average Abbe number for the glass material of the negative lens elements in the second lens group; $r_{II}$ represents the radius of curvature of an intermediate cemented surface in the second lens group; $\overline{N}_P$ represents the average refractive indices of the glass material for the positive lens elements in the third lens group; $\overline{N}_N$ represents the average refractive indices of the glass material for the negative lens elements in the third lens group; $r_{III}$ represents the radius of curvature of any cemented surface in the third lens group; $\Sigma d$ represents the total length of the lens system along the optical axis; and $r_2$ represents the radius of curvature of the image side surface of the negative meniscus single lens located at the front of the first lens group.

17. An improved fish eye lens system comprising from the object to the image side:
   a first lens group of a negative refractive power including two negative meniscus single lenses each being convex to the object side;
   a second lens group of a positive refractive power consisting of a pair of doublets each having intermediate cemented surfaces; and
   a third lens group of a positive refractive power consisting of a positive meniscus single lens convex to the image side and a doublet located at the image side of the positive meniscus single lens with an intermediate cemented surface of the doublet being positioned convex to the image side, wherein the lens system fulfills the following conditions:

| 0.5 | < | $|f_I|/f$ | < | 0.8 |
| 1.5 | < | $f_{II}/f$ | < | 2.8 |
| 8.0 | < | $\overline{v}_N - \overline{v}_P$ | < | 25.0 |
| 0.7 | < | $|r_{II}|/f$ | < | 3.5 |
| 0.18 | < | $\overline{N}_N - \overline{N}_P$ | < | 0.36 |
| 0.6 | < | $|r_{III}|/f$ | < | 1.7 |
| 2.2 | < | $\Sigma d/f$ | < | 3.2 |
| 0.65 | < | $r_2/f$ | < | 0.92 | wherein,
f represents the focal length of the whole lens system; $f_I$ represents the focal length of the first lens group; $f_{II}$ represents the focal length of the second lens group; $\overline{v}_P$ represents the average Abbe number for the glass material of the positive lens elements in the second lens group; $\bar{v}_N$ represents the average Abbe number for the glass material of the negative lens elements in the second lens group; $r_{II}$ represents the radius of curvature of any intermediate cemented surface in the second lens group; $\bar{N}_P$ represents the average refractive indices of the glass material for the positive lens elements in the third lens group; $\bar{N}_N$ represents the average refractive indices of the glass material for the negative lens elements in the third lens group; $r_{III}$ represents the radius of curvature of any cemented surface in the third lens group; $\Sigma d$ represents the total length of the lens system along the optical axis; and $r_2$ represents the radius of curvature of the image side surface of the negative meniscus single lens located at the front of the first lens group.

18. An improved fish eye lens system comprising from the object to the image side:
 a first lens group of a negative refractive power including two negative meniscus single lenses each being convex to the object side;
 a second lens group of a positive refractive power consisting of a doublet with an intermediate cemented surface, a positive single lens located at the image side of the doublet and a negative single lens located at the image side of the positive single lens; and
 a third lens group of a positive refractive power consisting of a positive meniscus single lens convex to the image side and a doublet located at the image side of the positive meniscus single lens with an intermediate cemented surface of the doublet being positioned convex to the image side, wherein the lens system fulfills the following conditions:

| | | | | |
|---|---|---|---|---|
| 0.5 | < | $\|f_I\|/f$ | < | 0.8 |
| 1.5 | < | $f_{II}/f$ | < | 2.8 |
| 8.0 | < | $\bar{v}_N - \bar{v}_P$ | < | 25.0 |
| 0.7 | < | $\|r_{II}\|/f$ | < | 3.5 |
| 0.18 | < | $\bar{N}_N - \bar{N}_P$ | < | 0.36 |
| 0.6 | < | $\|r_{III}\|/f$ | < | 1.7 |
| 2.2 | < | $\Sigma d/f$ | < | 3.2 |
| 0.65 | < | $r_2/f$ | < | 0.92 | wherein,
 f represents the focal length of the whole lens system; $f_I$ represents the focal length of the first lens group; $f_{II}$ represents the focal length of the second lens group; $\bar{v}_P$ represents the average Abbe number for the glass material of the positive lens elements in the second lens group; $\bar{v}_N$ represents the average Abbe number for the glass material of the negative lens elements in the second lens group; $r_{II}$ represents the radius of curvature of any intermediate cemented surface in the second lens group; $\bar{N}_P$ represents the average refractive indices of the glass material for the positive lens elements in the third lens group; $\bar{N}_N$ represents the average refractive indices of the glass material for the negative lens elements in the third lens group; $r_{III}$ represents the radius of curvature of any cemented surface in the third lens group; $\Sigma d$ represents the total length of the lens system along the optical axis; and $r_2$ represents the radius of curvature of the image side surface of the negative meniscus single lens located at the front of the first lens group.

* * * * *